United States Patent
Filter

(10) Patent No.: US 9,457,889 B2
(45) Date of Patent: Oct. 4, 2016

(54) ROTORCRAFT ROTOR INCLUDING PRIMARY PITCH HORNS AND SECONDARY HORNS

(71) Applicant: The Boeing Company, Chicago, IL (US)

(72) Inventor: Evan J. Filter, Philadelphia, PA (US)

(73) Assignee: THE BOEING COMPANY, Chicago, IL (US)

( * ) Notice: Subject to any disclaimer, the term of this patent is extended or adjusted under 35 U.S.C. 154(b) by 495 days.

(21) Appl. No.: 14/035,934

(22) Filed: Sep. 24, 2013

(65) Prior Publication Data

US 2015/0086358 A1    Mar. 26, 2015

(51) Int. Cl.
| | |
|---|---|
| B64C 11/30 | (2006.01) |
| B64C 27/46 | (2006.01) |
| B64C 27/605 | (2006.01) |
| B64C 27/615 | (2006.01) |
| B64C 27/32 | (2006.01) |
| B64C 27/72 | (2006.01) |

(52) U.S. Cl.
CPC .............. *B64C 11/30* (2013.01); *B64C 27/32* (2013.01); *B64C 27/46* (2013.01); *B64C 27/605* (2013.01); *B64C 27/615* (2013.01); *B64C 2027/7205* (2013.01); *Y02T 50/34* (2013.01)

(58) Field of Classification Search
CPC ....... B64C 11/06; B64C 11/30; B64C 11/36; B64C 27/32; B64C 27/46; B64C 27/605; B64C 27/615; B64C 2027/7205; B64C 2027/7294; Y02T 50/34
USPC .............................. 416/114, 115, 138, 134 A
See application file for complete search history.

(56) References Cited

U.S. PATENT DOCUMENTS

| | | | |
|---|---|---|---|
| 2,627,928 A | 2/1953 | Mullgardt | |
| 4,555,219 A | 11/1985 | Jeffery et al. | |
| 5,562,415 A * | 10/1996 | Legendre | B64C 27/48 416/114 |
| 6,065,934 A | 5/2000 | Jacot et al. | |
| 6,135,713 A | 10/2000 | Domzalski et al. | |
| 6,307,301 B1 | 10/2001 | Ngo et al. | |
| 6,471,477 B2 | 10/2002 | Hassan et al. | |
| 6,499,952 B1 | 12/2002 | Jacot et al. | |
| 6,543,719 B1 | 4/2003 | Hassan et al. | |
| 7,798,443 B2 | 9/2010 | Hamilton et al. | |
| 7,980,516 B2 | 7/2011 | Birchette | |

FOREIGN PATENT DOCUMENTS

| | | |
|---|---|---|
| EP | 0421631 B1 | 12/1993 |
| EP | 0936140 | 8/1999 |
| EP | 2099676 B1 | 12/2011 |

(Continued)

OTHER PUBLICATIONS

European Patent Office, Extended European Search Report, issued in connection with Application No. 14186011.4, Jan. 30, 2015, 9 pages.

(Continued)

*Primary Examiner* — Christopher Verdier
*Assistant Examiner* — Juan G Flores
(74) *Attorney, Agent, or Firm* — Hanley, Flight and Zimmerman, LLC

(57) ABSTRACT

A rotorcraft rotor comprises a blade having a pitch axis, a primary pitch horn for the blade, and a secondary horn opposite the primary pitch horn with respect to the pitch axis.

25 Claims, 10 Drawing Sheets

(56) References Cited

FOREIGN PATENT DOCUMENTS

| | | | |
|---|---|---|---|
| GB | 2464678 | 4/2010 | |
| GB | 2464678 A * | 4/2010 | ........... B64C 27/473 |
| WO | 8904276 | 5/1989 | |
| WO | 9915401 | 4/1999 | |

OTHER PUBLICATIONS

Canadian Intellectual Property Office, Office Action, issued in connection with Application No. 2,856,907, Sep. 30, 2015, 3 pages.

U.S. Appl. No. 13/705,780, filed Dec. 5, 2012.

* cited by examiner

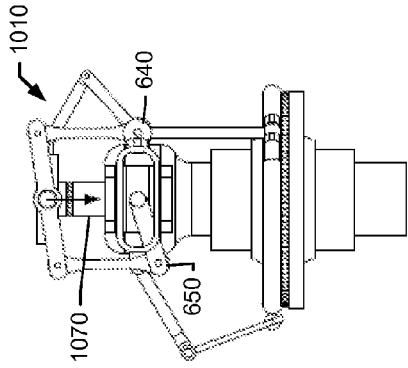
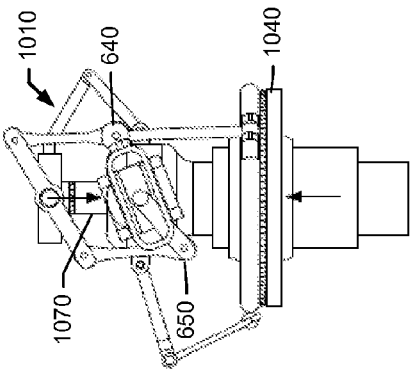
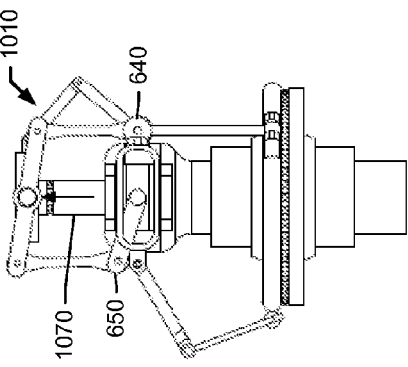
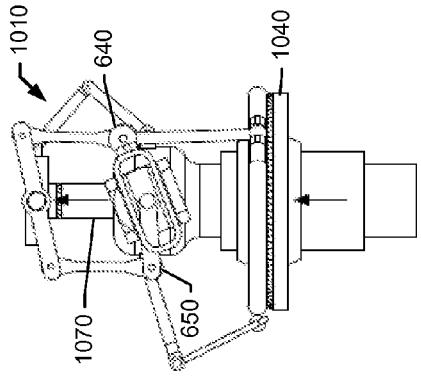
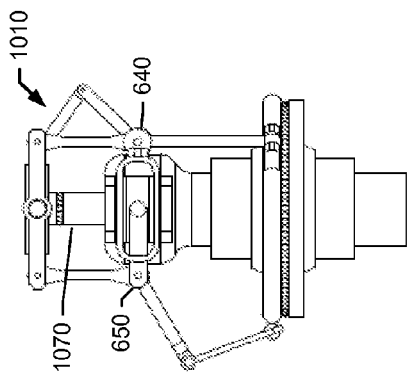
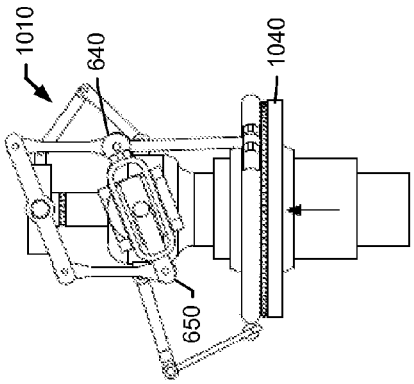

US 9,457,889 B2

ROTORCRAFT ROTOR INCLUDING PRIMARY PITCH HORNS AND SECONDARY HORNS

This invention was made with Government support under contract number W911W6-11-0002 awarded by the Aviation Applied Technology Directorate (AATD). The government has certain rights in this invention.

BACKGROUND

Helicopter blade pitch may be varied collectively to change climb rate, and it may be varied cyclically for directional movement. Pitch horns may be used to change overall blade pitch collectively in response to translation of a swashplate, and cyclically in response to tilting of the swashplate.

A blade may be configured to vary its flight mechanics in real time. As a first example, a blade is split into segments, and pitch of the segments may be controlled to affect lift or speed. As a second example, a blade is equipped with a trailing edge flap near its inboard side. Angle of the flap is varied to affect lift or speed. As a third example, a continuous blade is twisted along its pitch axis to affect lift or speed.

A helicopter rotor includes a rotating hub for carrying two or more blades. Actuators for the flaps and blade segments include hydraulic or electromechanical components mounted in the hub. Hydraulic or electrical power is transmitted from a non-rotating frame to the actuators in the hub.

SUMMARY

According to an embodiment herein, a rotorcraft rotor comprises a blade having a pitch axis, a primary pitch horn for the blade, and a secondary horn opposite the primary pitch horn with respect to the pitch axis.

According to another embodiment herein a rotorcraft comprises a rotor mast having a z-axis, a rotor hub mounted to the rotor mast, and a plurality of blade assemblies secured to the rotor hub. Each blade assembly includes a primary pitch horn and a secondary horn. The rotorcraft further comprises a rocker carrier configured to rotate about the z-axis and slide along the z-axis, and a plurality of rocker arms corresponding to the plurality of blade assemblies. The rocker arms are pivoted to the rocker carrier. Opposing sides of each rocker arm are linked to the primary pitch horn and the secondary horn of the corresponding blade assembly.

According to another embodiment herein, a method comprises using primary pitch horns to vary pitch of rotorcraft blades, and using secondary horns to vary flight mechanics of the blades. Angle of the secondary horns is unchanged or minimally changed with respect to angle of the primary pitch horns as the blades travel their collective and pitch cycle changes.

These features and functions may be achieved independently in various embodiments or may be combined in other embodiments. Further details of the embodiments can be seen with reference to the following description and drawings.

BRIEF DESCRIPTION OF THE DRAWINGS

FIGS. 12A-12F are illustrations of controlling the main rotor of FIGS. 10 and 11.

DETAILED DESCRIPTION

Figure 1:
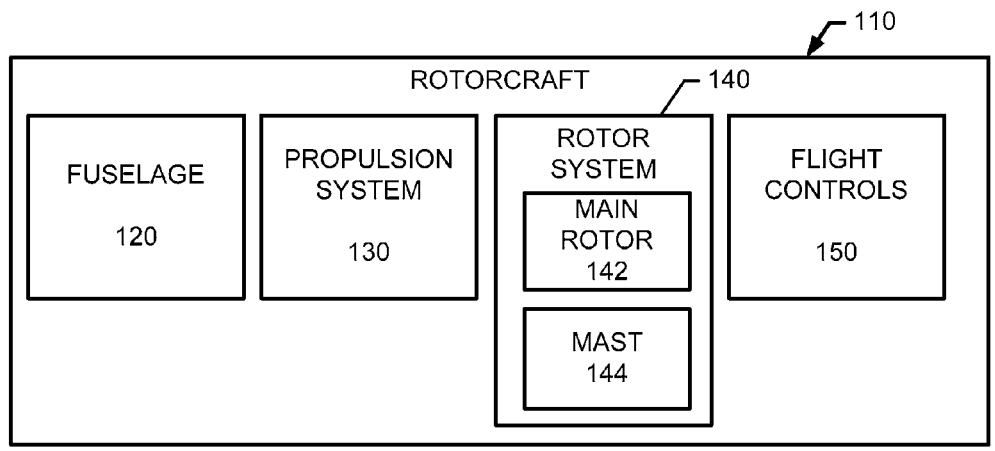
FIG. 1 is an illustration of a rotorcraft.
Figure 2:
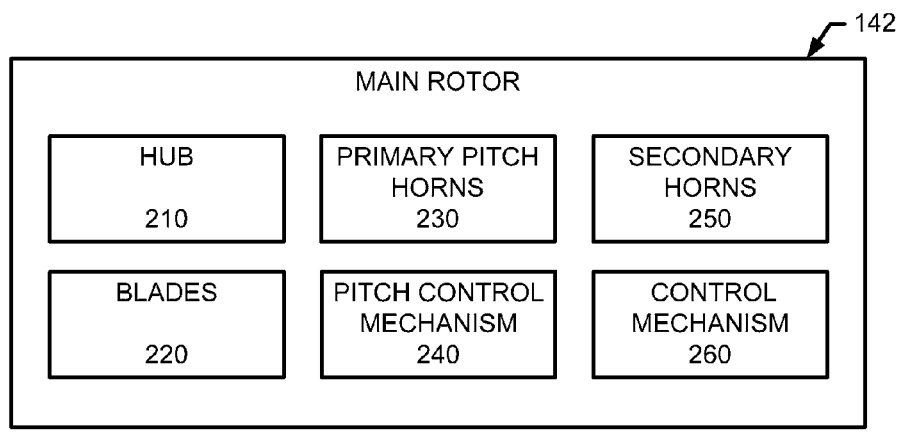
FIG. 2 is an illustration of a main rotor of the rotorcraft.

Reference is made to FIGS. 1 and 2. A rotorcraft 110 includes a fuselage 120, propulsion system 130, and rotor system 140. The rotor system 140 includes one or more main rotors 142 and rotor masts 144. Each main rotor 142 may be mounted on a rotor mast 144, and driven by the propulsion system 130. As but one example, the propulsion system 130 may include an engine and gearbox for turning a rotor mast 144 and a main rotor 142 mounted on the rotor mast 144.

The rotorcraft 110 further includes flight controls 150 configured to control collective and cyclic blade pitch of the blades 148. The flight controls 150 are also configured to control blade flight mechanics in real time. Examples of the blade flight mechanics will be described below.

Reference is now made to FIG. 2, which illustrates a main rotor 142. The main rotor 142 includes a hub 210 secured to the mast 144, and rotor blades 220 attached to the hub 210. Blade attachment may be hingeless, fully articulated, teetering, or a combination thereof. Each blade 220 has a pitch axis.

Figure 3:
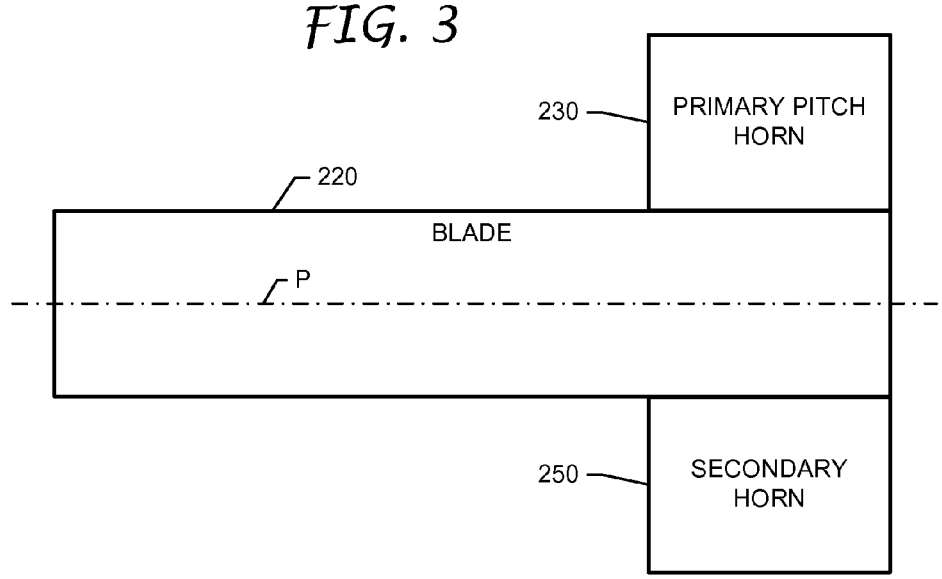
FIG. 3 is an illustration of a blade, primary pitch horn, and secondary horn of the main rotor.

Additional reference is made to FIG. 3. The main rotor 142 further includes a primary pitch horn 230 and a secondary horn 250 for each blade 220. Each secondary horn 250 is paired with a primary pitch horn 230. For each blade 220, the primary pitch horn 230 and the secondary horn 250 are attached to the hub 210 on opposite sides of the pitch axis (P).

The main rotor 142 further includes a pitch control mechanism 240, responsive to the flight controls 150, for causing the primary pitch horns 230 to vary blade pitch collectively and/or cyclically. The pitch control mechanism 240 may include a conventional swashplate and primary pitch links. Raising and lowering the swashplate causes the primary pitch horns 230 to vary blade pitch collectively. Tilting the swashplate causes the blade pitch to vary cyclically.

The main rotor 142 further includes a secondary horn control mechanism 260, described below, for collectively moving the secondary horns 250 in response to the flight controls 150. The control mechanism 260 is configured such that angle of the secondary horns 250 is unchanged or minimally changed with respect to the primary pitch horns 230 as the blades 220 travel their collective and pitch cycle changes.

The secondary horns 250 may be used to change blade flight mechanics of the blade 220. As a first example, the blade 220 includes a trailing edge flap near its inboard side.

The secondary horn 250 rotates a torque tube that, through either a gearbox or a system of cams and rods, causes angle of the flap to change.

As a second example, the blade 220 includes an inboard segment and an outboard segment. The primary pitch horn is connected to the inboard segment, and the secondary horn 250 is connected to the outboard segment via a torque tube. The secondary horn 250 rotates the torque tube to vary pitch of the outboard segment.

As a third example, the blade 220 is manufactured with a degree of built-in twist, generally half way between hover and cruise twist. One end of a torque tube extends to a tip of the blade 220. The secondary horn 250 is connected to an opposite end of the torque tube. The torque tube is rotated in one direction to cause the tip of the blade to pitch up. While twisting the tip up, the overall blade 220 is pitched down, resulting in the inboard part of the blade 220 having more pitch relative to the outboard part. The torque tube is rotated in an opposite direction to cause the tip to pitch down, and the overall blade to pitch up, resulting in the inboard part of the blade having reduced pitch relative to the outboard part.

Figure 4:
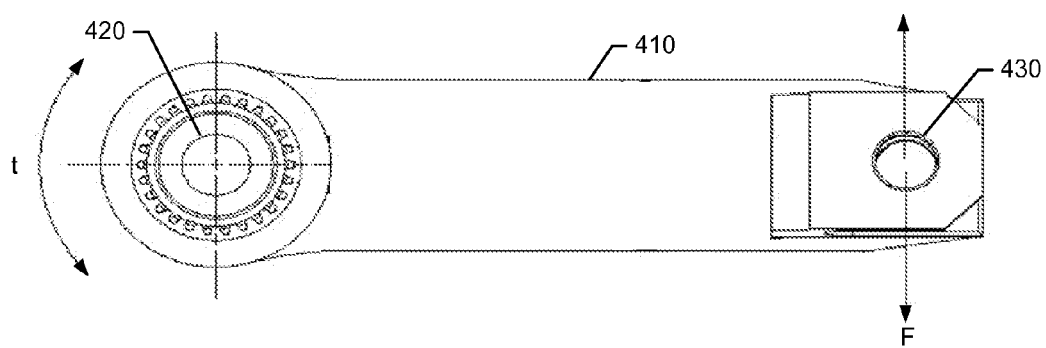
FIG. 4 is an illustration of a lever arm of a horn.

FIG. 4 illustrates an example of a pitch horn lever arm 410. The lever arm 410 has a rotating member connection end 420, and a link connection end 430.

The lever arm 410 of FIG. 4 may be adapted for use with the primary pitch horn 230 of FIG. 3. The rotating member connection end 420 is coupled to a rotor blade 220. A force (F) applied at the link connection end 430 creates a torque (t) that causes the blade 220 (or a segment of the blade) to rotate about its pitch axis (P).

The lever arm 410 of FIG. 4 may be adapted for use with the secondary horn 250 of FIG. 3. The rotating member connection end 420 is coupled to a torque tube or other member inside the blade 220. A force (F) applied at the link connection end 430 creates a torque (t) that causes the torque tube or other member to rotate about its axis.

Figure 5:
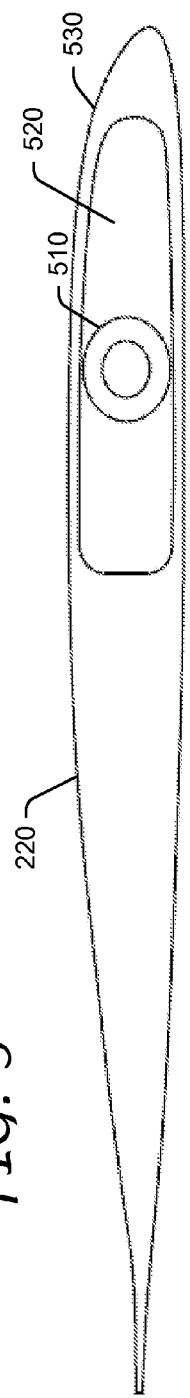
FIG. 5 is an illustration of a torque tube within a blade.

FIG. 5 illustrates an example of a torque tube 510 located within the rotor blade 220. For example, the torque tube 510 is located within a blade cavity 520 that is internal to a spar 530 of the blade 220. The spar 530 forms the internal walls of the blade cavity 520. As an alternative to the torque tube 510, motion may be transferred into a cable or set of cams and rods within the blade cavity 520

As will be seen in the examples below, the secondary horns 250 and control mechanism 260 may be used with a conventional swashplate and swashplate controls. Blade flight mechanics may be controlled without redesigning the swashplate and its controls.

Further, the blade flight mechanics may be changed without the use of electromechanical or hydraulic actuators in the rotating frame. Still further, forces may be transmitted from a non-rotating frame to the hub solely by mechanical means. By transmitting forces solely by mechanical means, the need to provide electrical power/working fluid to the rotating frame is eliminated.

Figure 6:
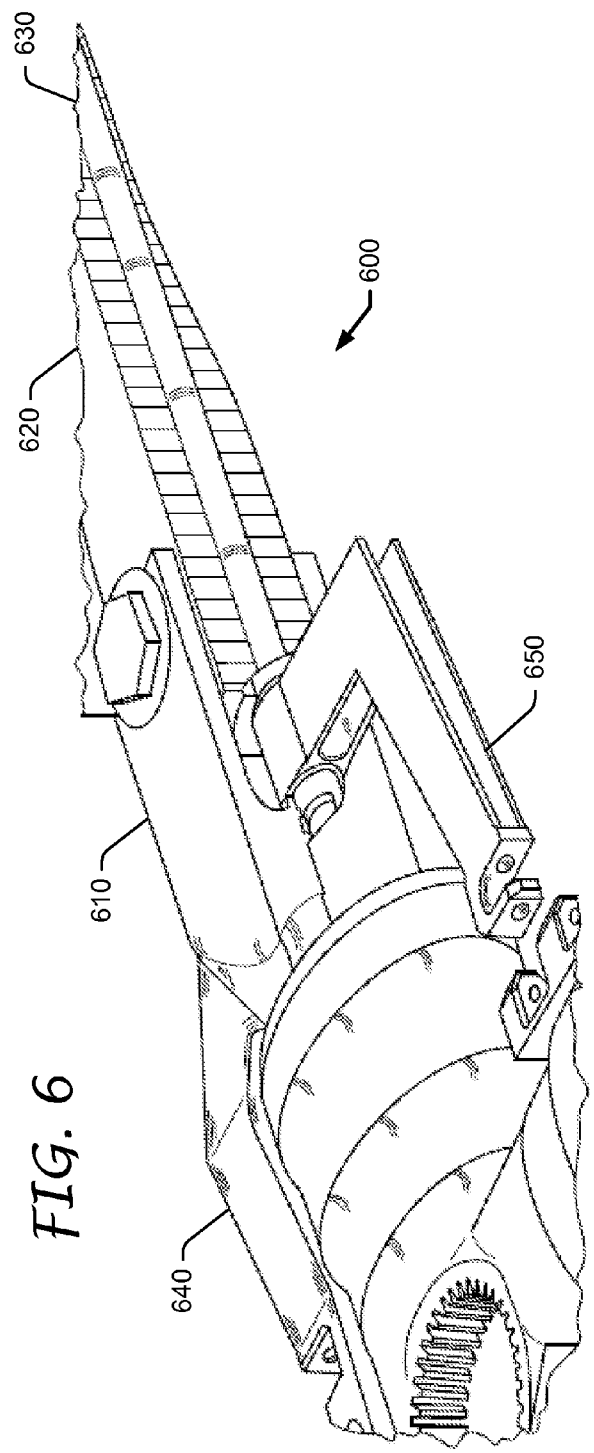
FIG. 6 is an illustration of a blade assembly.

Reference is now made to FIG. 6, which illustrates an example of a hingeless blade assembly 600. The blade assembly 600 includes a blade pitch housing 610, and blade 620 whose root is attached to the blade pitch housing 610. Portions of the blade pitch housing 610 and the blade 620 have been cut away to show a torque tube 630 extending through the blade pitch housing 610 and the blade 620. A rotating member connection end of a primary pitch horn 640 is joined to the blade pitch housing 610. A rotating member connection end of a secondary horn 650 is joined to the torque tube 630. The horns 640 and 650 are on opposite sides of the blade's pitch axis.

Figure 8:
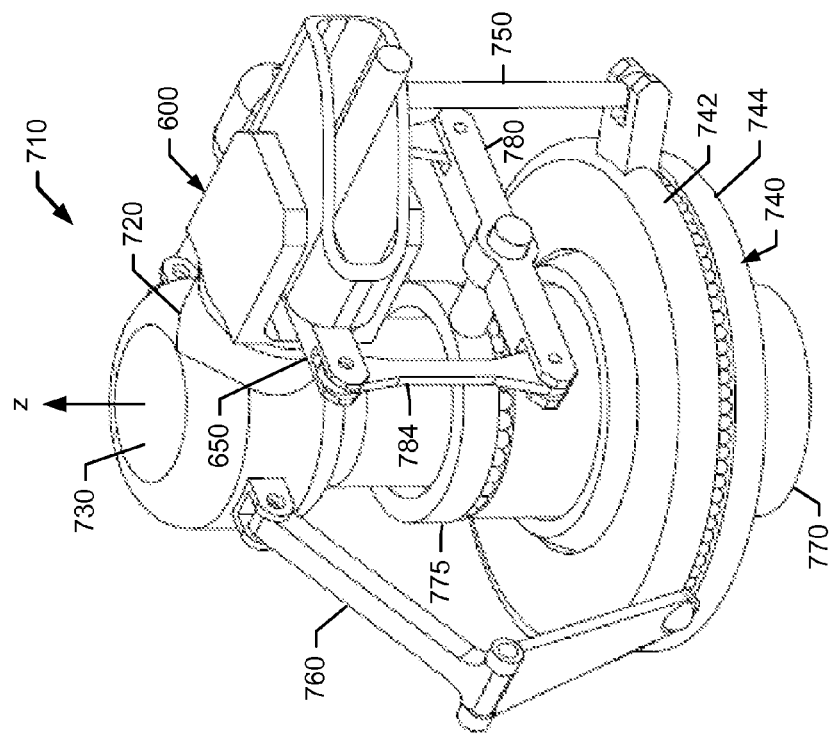
FIGS. 7 and 8 are illustrations of a first example of a main rotor of a rotorcraft.
Figure 7:
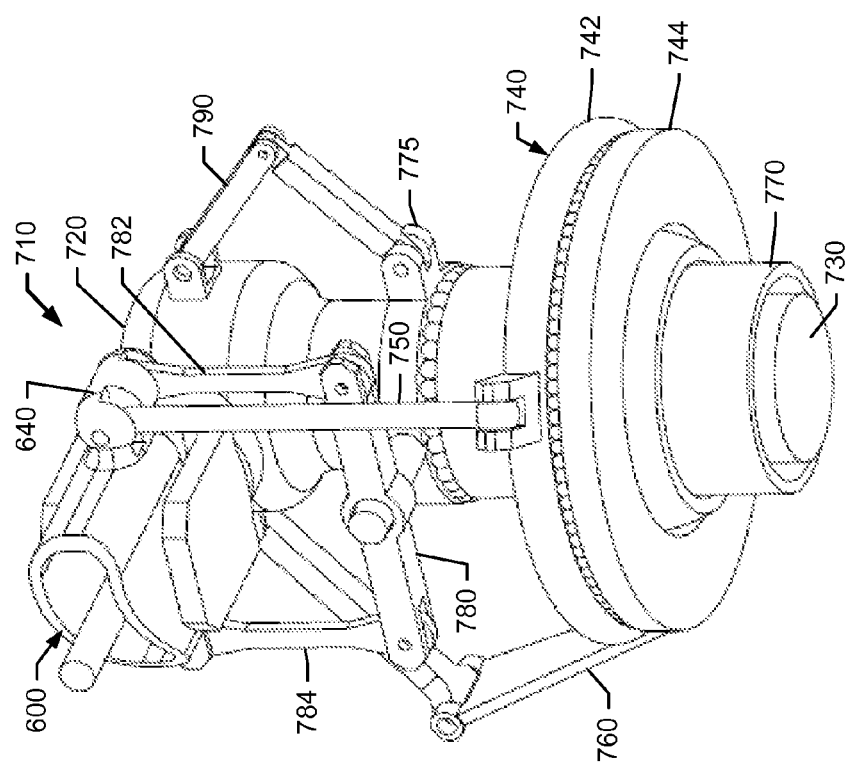

Reference is made to FIGS. 7 and 8, which illustrate a first example of a main rotor 710. The main rotor 710 includes a hub 720. A rotor mast 730 extends thorough the main rotor 710 and is secured to the hub 720. The rotor mast 730 rotates about its longitudinal axis (the "z-axis").

The main rotor 710 further includes a plurality of blade assemblies 600 mounted to the hub 720. To simplify the illustration of the main rotor 710, however, only a single blade assembly 600 is shown.

The main rotor 710 has a rotating frame and a non-rotating frame. The hub 720, blade assemblies 600 and other elements that rotate with the hub 720 about the z-axis are considered part of the rotating frame. Those elements that do not rotate with the hub 720 are considered part of the non-rotating frame.

The main rotor 710 further includes a conventional swashplate 740 having rotating elements 742 and non-rotating elements 744. Primary pitch links 750 connect the rotating element 742 of the swashplate 740 to link connection ends of the primary horns 640 of the blade assemblies 600. Swashplate actuators (not shown) raise, lower and tilt the non-rotating element 744 of the swashplate 740, which in turn raises, lowers and tilts the rotating element 742. The rotating element 742 of the swashplate 740 is raised and lowered to vary blade pitch collectively, and it is tilted to vary blade pitch cyclically. As the rotor hub 720 is being driven, a main drive scissor 760 transfers rotational torque from the rotor hub 720 to the swashplate 740, keeping the two rotationally aligned while still allowing the degrees of freedom for cyclic and collective movements.

The main rotor 710 further includes a control mechanism for collectively moving the secondary horns 650. A slide cylinder 770 extends through a central opening in the swashplate 740 and surrounds the rotor mast 730. The slide cylinder 770 is part of the non-rotating frame, but is configured (e.g., by a stationary slider guide that is fixed to the non-rotating frame) to slide up and down along the z-axis.

A rocker carrier 775 sits atop the slide cylinder 770 and is part of the rotating frame. The rocker carrier 775 slides conjointly with the slide cylinder 770 along the z-axis, but is configured (e.g., with ball bearings) to rotate relative to the slide cylinder 770. Thus, the rocker carrier 775 can rotate about the z-axis, whereas the slide cylinder 770 cannot.

A plurality of rocker arms 780 correspond to the plurality of blade assemblies 600. Each rocker arm 780 is pivoted to the rocker carrier 775 beneath a corresponding blade assembly 600. For example, each rocker arm 780 pivots about a post that extends radially outward from the rocker carrier 775. Each post may be vertically coplanar with the blade pitch axis of its corresponding blade assembly 600.

A secondary link 782 connects one side of a rocker arm 780 to the primary pitch horn 640 of its corresponding blade assembly 600, and a tertiary link 784 connects the other side of the rocker arm 780 to the secondary horn 650 of its corresponding blade assembly 600. Each rocker arm 780 is free to pivot about an axis just below the blade pitch axis of its corresponding pitch assembly 600. Since the rocker arms 780 are pivoted to the rocker carrier 775 and linked to the blade assemblies 600, they are rotated as a group with the hub 720. The rocker arms 780 are also slid as a group along the z-axis in response to the movement of the slide cylinder 770. A secondary drive scissor 790 is located between the hub 720 and the rocker carrier 775 to force the rocker carrier 775 to rotate with the hub 720.

Figure 9A:
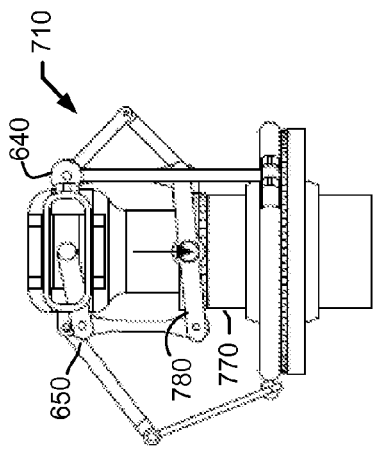
FIGS. 9A-9F are illustrations of controlling the main rotor of FIGS. 7 and 8.
Figure 9B:
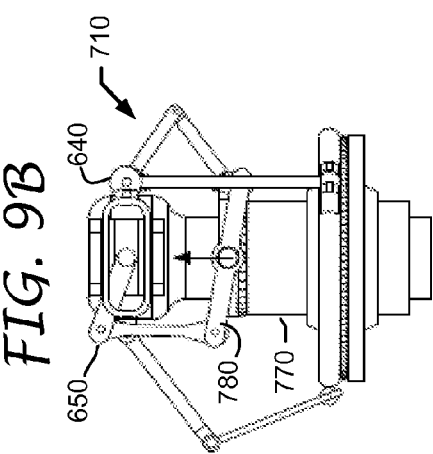
Figure 9C:
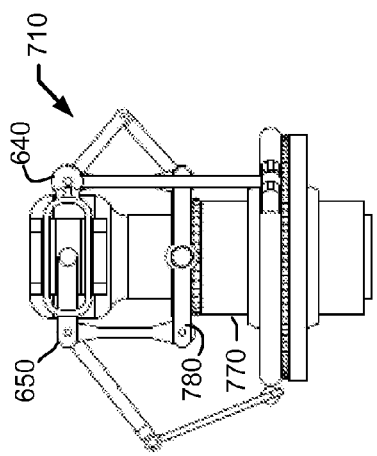

Additional reference is made to FIGS. 9A-9F, which illustrate the control of the main rotor 710. FIGS. 9A, 9B and 9C illustrate the main rotor 710 with no primary pitch input.

In FIG. 9A, there is no secondary input either. In FIG. 9B, the slide cylinder 770 is slid upward, which results in a positive secondary input. In FIG. 9C, the slide cylinder 770 is slid downward, which results in a negative secondary input. Moving the slide cylinder 770 upwards or downwards results in vertical translation of the pivot points of the rocker arms 780. Since one side of each rocker arm 780 is fixed to the position of the primary pitch horn 640 by the secondary link 782, the displacement is then forced into the secondary horn 650. As a result, the angle of the secondary horns 650 is changed, while the angle of the primary pitch horns 640 remains unchanged.

Figure 9D:
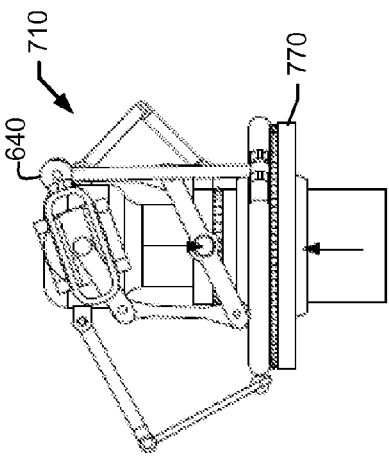
Figure 9E:
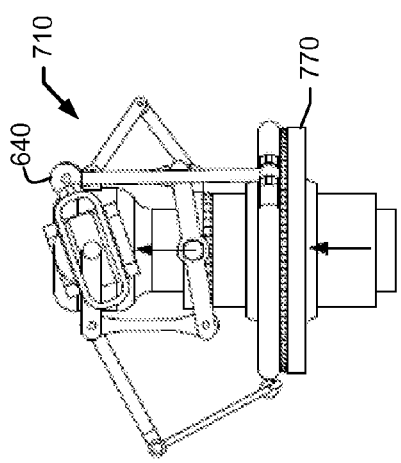
Figure 9F:
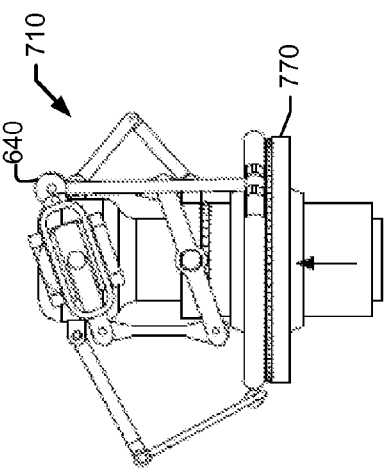

FIGS. 9D, 9E and 9F illustrate the main rotor 710 with the swashplate 740 moved upwards to create a positive primary pitch input. FIG. 9D illustrates no secondary input. Throughout an entire rotor revolution, the secondary horns 650 are minimally changed with respect to the primary pitch horns 640.

FIG. 9E illustrates positive secondary input in addition to the positive primary pitch input, and FIG. 9F illustrates negative secondary input in addition to the positive primary pitch input. The angle of the secondary horns is changed with respect to the angle of the primary pitch horns 640.

Figure 11:
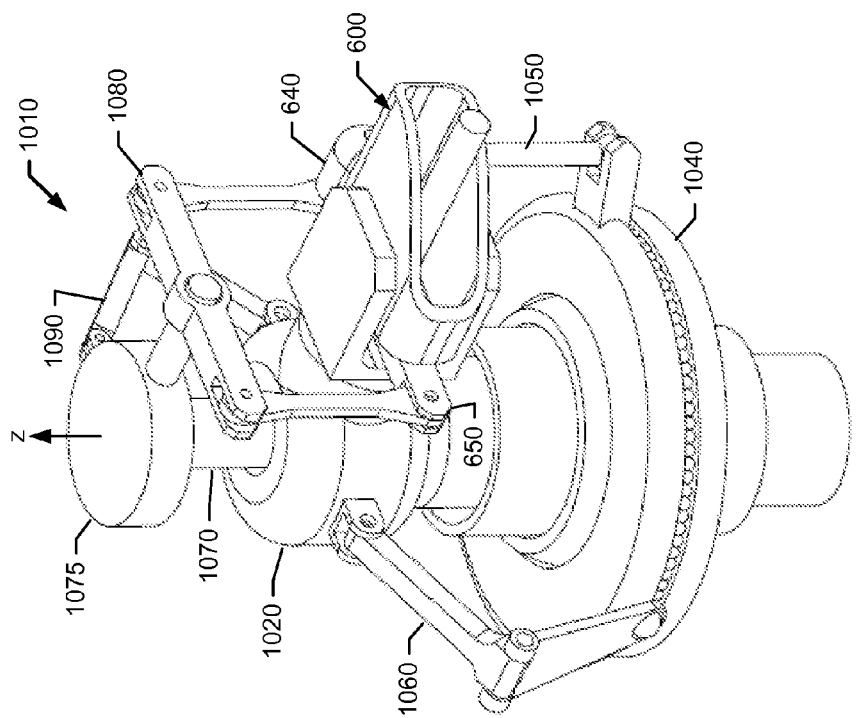
FIGS. 10 and 11 are illustrations of a second example of a main rotor of a rotorcraft.
Figure 10:
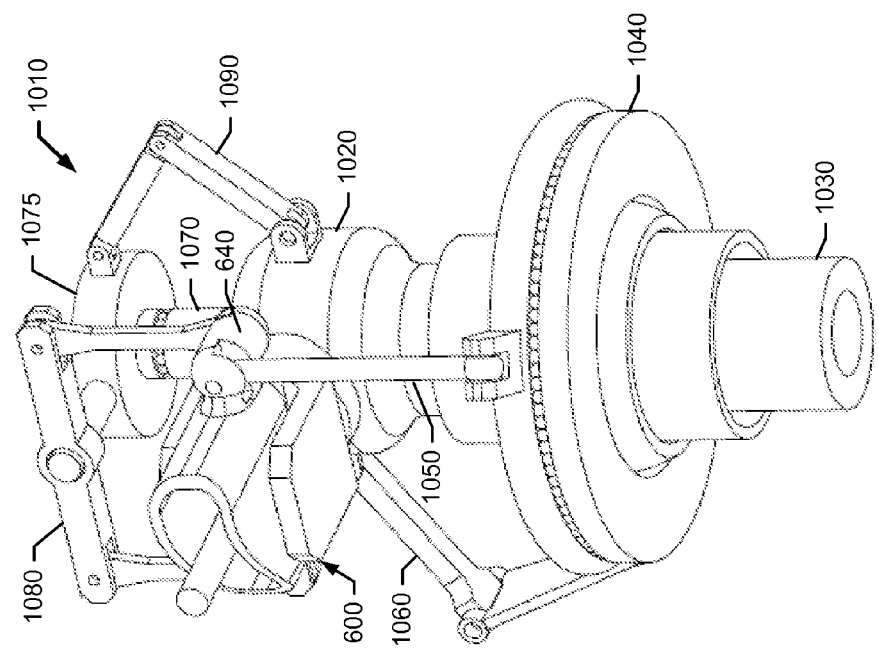

Reference is made to FIGS. 10 and 11, which illustrate a second example of a main rotor 1010. In this second example, as with the first, the main rotor 1010 includes a hub 1020 that accommodates a plurality of blade assemblies 600 (only one blade assembly 600 is shown in FIGS. 10 and 11), a conventional swashplate 1040 that is linked to the primary pitch horns 640 via primary pitch links 1050, and a drive scissor 1060. The main rotor 1010 also includes a rocker arm 1040 for each pair of primary and secondary horns 640 and 650, where opposite ends of the rocker arm 1040 are linked to the primary and second horns 640 and 650. A rotor mast 1030 extends through a central opening in the swashplate 1040 and is secured to the hub 1020.

The main rotor 1010 further includes a slide cylinder 1070, rocker carrier 1075, rocker arms 1080, and secondary drive scissor 1090. However, rather than locating the rocker carrier 1075 and rocker arms 1080 between the blade assemblies 600 and swashplate 1040, the rocker carrier 1075 and the rocker arms 1080 are located above the blade assemblies 600.

The slide cylinder 1070 extends through the rotor mast 1030 and past the rotor mast 1030. Atop the slide cylinder 1070 is the rocker carrier 1075. The rocker carrier 1075 moves conjointly with the slider cylinder 1070 along the z-axis, but is configured (e.g., with ball bearings) to rotate relative to the slider cylinder 1070.

The rocker arms 1080 are pivoted to the rocker carrier 1075. One side of each rocker arm 1080 is linked to a primary pitch horn 640 of a corresponding blade assembly 600, and the other side of each rocker arm 1080 is linked to a secondary horn 650 of the corresponding blade assembly 600.

Additional reference is made to FIGS. 12A-12F, which illustrate the control of the main rotor 1010. FIGS. 12A, 12B and 12C illustrate the main rotor 1010 with no primary pitch input. In FIG. 12A, there is no secondary input either. In FIG. 12B, the slide cylinder 1070 is slid upward, which results in a positive secondary input. In FIG. 9C, the slide cylinder 1070 is slid downward, which results in a negative secondary input. As with the first example, the angle of the secondary horns 650 is changed, while the angle of the primary pitch horns 640 remains unchanged.

FIGS. 12D, 12E and 12F illustrate the main rotor 1010 with the swashplate 1040 moved upwards to create a positive primary pitch input. FIG. 12D illustrates no secondary input. Throughout an entire rotor revolution, the secondary horns 650 are minimally changed with respect to the primary pitch horns 640.

FIG. 12E illustrates upward movement of both the swashplate 1040 and the slide cylinder 1070, which creates both positive primary pitch input and positive secondary input. FIG. 12F illustrates upward movement of the swashplate 1040 and downward movement of the slide cylinder 1070, which creates positive primary pitch input and negative secondary input. In both illustrations, the angle of the secondary horns 650 is changed with respect to the angle of the primary pitch horns 640.

In this second example, the swashplate control area is less crowded and enables easier integration of the drive scissors (although the crowding is less of an issue for a main rotor having only two blade assemblies).

In the examples above, the swashplate is linked to the primary pitch horns, and the primary pitch horns alone are used to change blade pitch collectively and cyclically. However, a main rotor herein is not so limited.

Figure 14:
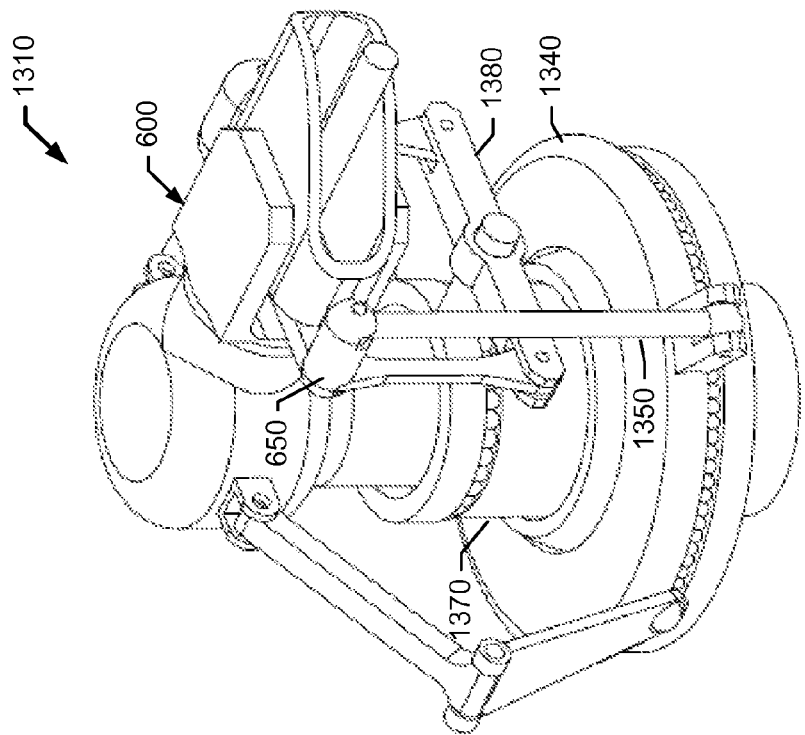
FIGS. 13 and 14 are illustrations of a third example of a main rotor of a rotorcraft.
Figure 13:
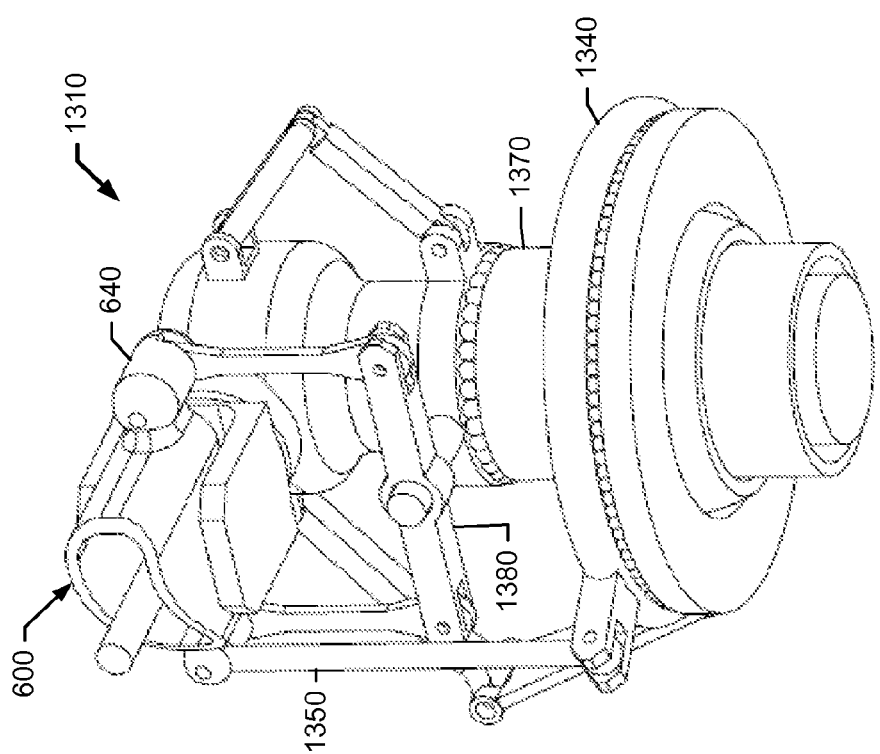

Reference is made to FIGS. 13 and 14, which illustrate a third example of a main rotor 1310. The third example is similar to the first example, except that the main rotor 1310 of FIGS. 13 and 14 has a swashplate 1340 linked (via links 1350) to the secondary horn 650 of each blade assembly 600 instead of the primary horn 640.

Figures 15A, 15B, 15C:
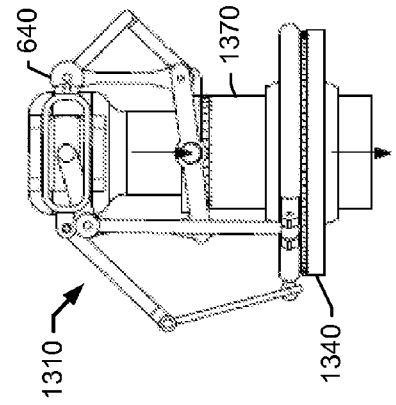
FIGS. 15A-15F are illustrations of controlling the main rotor of FIGS. 13 and 14.

Additional reference is made to FIGS. 15A-15F, which illustrate the control of the main rotor 1310. FIG. 15A illustrates the main rotor 1310 with no inputs. FIG. 15B illustrates upward movement of both the swashplate 1340 and the slide cylinder 1370 to change blade flight mechanics, and FIG. 15C illustrates downward movement of both the swashplate 1340 and the slide cylinder 1370 to change blade flight mechanics. In both FIGS. 15B and 15C, the slide cylinder 1370 is moved so that the primary pitch horn 640 has no input.

Figures 15D, 15E, 15F:
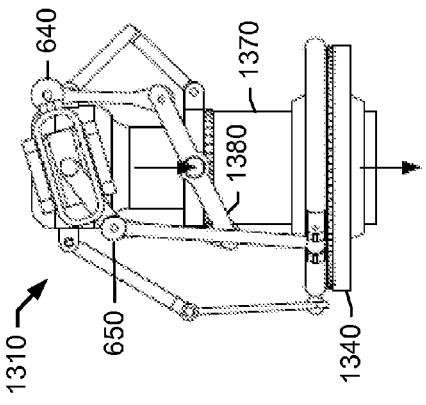

FIG. 15D illustrates a negative downward movement of the swashplate 1340 to change blade flight mechanics. The slide cylinder 1370 is not moved. Since the primary and secondary horns 640 and 650 are linked by a rocker arm 1380, and since the pivot of the rocker arm 1380 is not moved along the z-axis, primary pitch input is changed.

FIG. 15E illustrates an upward movement of the slide cylinder 1370 and no movement of the swashplate 1340 to create a positive primary pitch input and a positive secondary input. FIG. 15F illustrates downward movements of the slide cylinder 1370 and the swashplate 1340 to create a positive primary pitch input and a negative secondary input.

In the three examples above, control of the main rotors is described with primary positive input, but not primary negative input. In practice, main rotor control may be performed with different combinations of no input, positive inputs and negative inputs.

Figure 16:
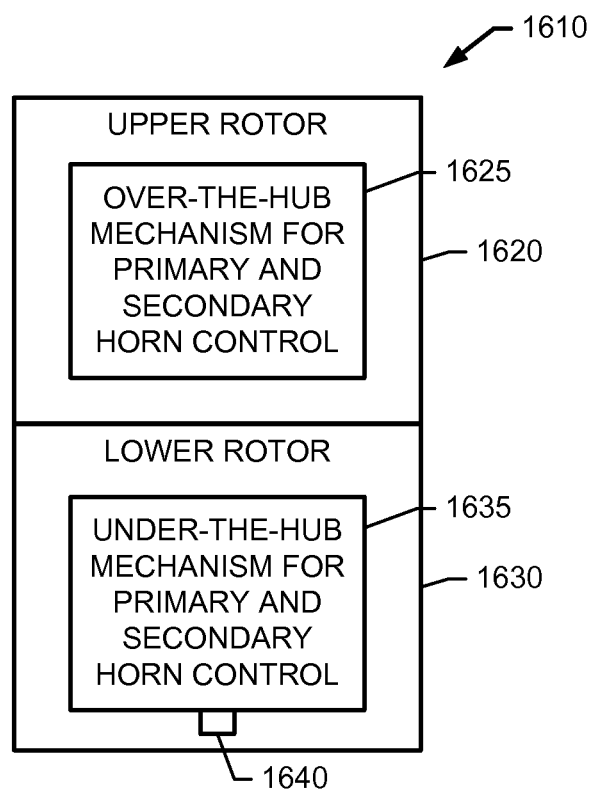
FIG. 16 is an illustration of a fourth example of a main rotor of a rotorcraft.

Reference is now made to FIG. 16. A rotorcraft herein may include a coaxial rotor 1610 having an upper rotor 1620 and a lower rotor 1630. Primary and secondary horns of the upper rotor 1620 may be controlled by an over-the-hub mechanism 1625 (e.g., the swashplate, slide cylinder, rocker carrier, rocker arms, and links of FIGS. 10 and 11). Primary and secondary horns of the lower rotor 1630 may be controlled by an under-the-hub mechanism 1635 (e.g., the swashplate, rocker carrier, rocker arms, and links of FIGS. 7 and 8), except that the slide cylinder only extends from the between the two rocker carriers. Both rocker carriers may be mounted to the slide cylinder for rotation about the z-axis and constrained to move with the slide cylinder along the z-axis. An extension 1640 of the slide cylinder is rotatably mounted to the rocker carrier of the lower rotor 1630, and extends downward through the swashplate of the lower rotor 1630. Movement of the extension 1640 along the z-axis causes the two rocker carriers and slide cylinder to move along the z-axis.

Another embodiment of the coaxial rotor may include an under-the-hub mechanism for each of the upper rotor and the lower rotor. In this embodiment, the lower rocker carrier may extend upward past the lower rotor and connect to a bearing where the upper rocker carrier is mounted.

Still another embodiment of the coaxial rotor may include an above-the-hub mechanism for each of the upper rotor and the lower rotor. In this embodiment, the upper rocker carrier extends downward past the upper rotor.

A rotorcraft herein is not limited to a main rotor. A rotorcraft herein may have two or more rotors.

A rotorcraft herein is not limited to a helicopter. A rotorcraft herein may be a tilt wing or fixed wing rotorcraft.

A rotorcraft herein is not limited to manned vehicle. A rotorcraft herein may be unmanned.

The invention claimed is:

1. A rotorcraft rotor comprising:
a hub to rotate about a z-axis via a rotor mast;
a blade coupled to the hub, the blade having a pitch axis;
a primary horn and a secondary horn coupled to the blade, the secondary horn being positioned opposite the primary horn with respect to the pitch axis;
a control mechanism to vary a first angle of the primary horn relative to a second angle of the secondary horn, the control mechanism to maintain the second angle of the secondary horn with respect to the first angle of the primary horn when the blade moves through collective or pitch cycle changes, the control mechanism including:
a rotating portion including a rocker arm and a rocker carrier, the rocker arm pivotally coupled to the rocker carrier about a pivot axis normal to the z-axis, the primary and secondary horns linked to the rocker arm on opposite sides of the pivot axis, the rocker carrier to slide along the z-axis, the rotating portion of the control mechanism to rotate with the hub and change the first angle of the primary horn and the second angle of the secondary horn; and
a non-rotating portion to provide mechanical control inputs to the rotating portion, the non-rotating portion of the control mechanism including a slide cylinder to cause the rocker carrier to slide along the z-axis.

2. The rotor of claim 1, wherein the blade has a mechanism to change blade flight mechanics, and wherein the secondary horn is mechanically coupled to the mechanism.

3. The rotor of claim 1, further comprising a torque tube within the blade, wherein the primary horn is connected to the blade and the secondary horn is connected to the torque tube.

4. The rotor of claim 1, further comprising a swashplate linked to the primary horn, the slide cylinder to extend through a central opening in the swashplate.

5. The rotor of claim 1, further comprising a swashplate linked to the secondary horn.

6. The rotor of claim 1, wherein the rocker arm and the rocker carrier are located below the blade.

7. A rotorcraft rotor comprising:
a hub to rotate about a z-axis via a rotor mast;
a blade coupled to the hub, the blade having a pitch axis;
a primary horn and a secondary horn coupled to the blade, the secondary horn being positioned opposite the primary horn with respect to the pitch axis;
a control mechanism to vary a first angle of the primary horn relative to a second angle of the secondary horn, the control mechanism to maintain the second angle of the secondary horn with respect to the first angle of the primary horn when the blade pitch changes at least one of collectively or cyclically, the control mechanism including:
a rotating portion including a rocker arm and a rocker carrier located above the blade, the rocker arm pivotally coupled to the rocker carrier about a pivot axis normal to the z-axis, the primary and secondary horns linked to the rocker arm on opposite sides of the pivot axis, the rocker carrier to slide along the z-axis, the rotating portion of the control mechanism to rotate with the hub and change the first angle of the primary horn and the second angle of the secondary horn; and
a non-rotating portion to provide mechanical control inputs to the rotating portion.

8. A method comprising:
using first horns to vary blade pitch of rotorcraft blades at least one of collectively or cyclically;
using second horns to vary flight mechanics of the rotorcraft blades, wherein an angle of the second horns is unchanged with respect to an angle of the first horns when varying the blade pitch via the first horn; and
varying the angle of the second horns by translating collectively rocker arms coupled between the first and second horns of each of the rotorcraft blades.

9. The method of claim 8, further including varying a position of outboard flaps of the rotorcraft blades by varying the angle the second horns.

10. The method of claim 8, wherein each rotorcraft blade includes an inboard segment and an outboard segment, the method including controlling a pitch of the inboard segment via the first horns and controlling a pitch of the outboard segment controlled via the second horns.

11. The method of claim 8, further including varying blade twist of the rotorcraft blades by varying the angle of the second horns.

12. The method of claim 8, further including coupling each of the first horns to a swashplate.

13. The rotor of claim 1, further comprising a torque tube within the blade, wherein the secondary horn is connected to the blade and the primary horn is connected to the torque tube.

14. A method comprising:
using first horns to vary blade pitch of rotorcraft blades at least one of collectively or cyclically; and
using second horns to vary flight mechanics of the rotorcraft blades, wherein an angle of the second horns is unchanged with respect to an angle of the first horns when varying the blade pitch via the first horn, wherein a rocker arm is linked between the primary and secondary horns of each blade, and wherein each second horn is linked to a swashplate.

15. A rotorcraft comprising:
a rotor mast having a z-axis;
a rotor hub coupled to the rotor mast;
a blade assembly coupled to the rotor hub, the blade assembly including a blade, a first horn, and a second horn;
a first control assembly to vary a first angle of the first horn; and a second control assembly to vary a second angle of the second horn, the second control assembly including:
  a rocker carrier configured to rotate about the z-axis and slide long the z-axis; and
  a rocker arm pivotally coupled to the rocker carrier about a pivot axis, the rocker arm having a first end fixed relative to the first horn and a second end coupled to the second horn, the rocker arm to pivot about the pivot axis to vary the second angle of the second horn without changing the first angle of the first horn when the rocker carrier slides along the z-axis.

16. The rotorcraft of claim 15, wherein the blade assembly defines a pitch axis, the first horn positioned on a first side of the pitch axis and the second horn positioned on a second side of the pitch axis opposite the first side.

17. The rotorcraft of claim 16, wherein the pivot axis of the rocker arm is positioned below the pitch axis or above the pitch axis.

18. The rotorcraft of claim 15, wherein the pivot axis of the rocker arm is non-parallel relative to the z-axis.

19. The rotorcraft of claim 15, wherein the first control assembly includes a swashplate coupled to the first horn via a first link, and wherein the swashplate is to move relative to the z-axis to vary the first angle of the first horn.

20. The rotorcraft of claim 15, further including a slide cylinder coupled to the rocker carrier, the slide cylinder to slide along the z-axis to move the rocker carrier in a direction along the z-axis.

21. The rotorcraft of claim 20, wherein movement of the rocker carrier along the z-axis is to cause the rocker arm to rotate about the pivot axis.

22. The rotorcraft of claim 20, wherein the slide cylinder extends through a central opening of a swashplate and surrounds the rotor mast.

23. The rotorcraft of claim 15, further including a first link to couple the first end of the rocker arm to the first horn and a second link to couple the second end of the rocker arm to the second horn.

24. The rotorcraft of claim 15, wherein the rocker arm includes a longitudinal axis that is non-parallel relative to a longitudinal axis of the blade and the z-axis.

25. The rotorcraft of claim 15, wherein at least one of the first horn or the second horn is to vary a blade pitch of the blade at least one of collectively or cyclically, and the other one of the first horn or the second horn is to vary a twist angle of the blade.

* * * * *